UNITED STATES PATENT OFFICE.

WILLIAM A. STEINEMANN, OF LOS ANGELES, CALIFORNIA.

CHEWING GUM.

1,416,242.   Specification of Letters Patent.   Patented May 16, 1922.

No Drawing.   Application filed February 7, 1920. Serial No. 357,035.

*To all whom it may concern:*

Be it known that I, WILLIAM A. STEINEMANN, a citizen of the United States, residing at Los Angeles, in the county of Los Angeles and State of California, have invented a new and useful Chewing Gum, of which the following is a specification.

This invention relates more especially to a chewing gum particularly adapted to cleanse or to aid in cleansing the teeth, and an object of the invention is to provide a gum of this character which contains an abrasive substance or substances combined with a suitable binder so that when the mixture is chewed it acts to produce friction on the teeth, the friction being sufficient to remove the film or deposit which tends to coat the teeth and give lodgement to germs detrimental thereto.

This gum can be used after eating in addition to brushing the teeth in the customary manner or, if the pressure of other duties makes it impossible for a person to spare the time necessary to employ the brush, the gum may be used in lieu thereof without causing any delay.

Some of the ingredients of this chewing gum may be varied to suit the choice or taste of the user, but an essential constituent of the gum is a suitable abrasive scouring or cleansing substance which will offer sufficient roughness, when the gum is chewed, to cleanse the exposed surfaces of the teeth. Among the abrasive substances which I have satisfactorily employed for this purpose is bran, alone or in combination with such other abrasives as precipitated chalk and charcoal. I prefer to employ commercial bran as the abrasive or cleansing substance because, though fibrous, it is not so rough and gritty as to be unpalatable, and at the same time the fibers thereof are sufficiently flexible to produce an excellent scouring action upon the teeth, when the gum, of which it is an element, is chewed.

I mix the abrasive with a suitable binder. The binder should be of a nature to hold in combination therewith the abrasive substance or substances employed, and I have successfully used the ordinary commercial chewing gum for this purpose. Other substances which may be employed as a binder are chicle and paraffine. The invention is not limited to the employment of the binder substances named above, since other substances suitable for the purpose may be employed in lieu thereof.

The ingredients may be mixed in various proportions depending upon the degree of roughness or abrasive quality required in the finished product. I have successfully used bran and commercial chewing gum combined in the proportions of approximately two ounces of the bran to about one pound of the commercial chewing gum. The abrasive substance or substances may be mixed with the commercial chewing gum during the process of manufacturing said commercial chewing gum, or after such process has been completed. The mixing may be accomplished more readily by heating the binder.

To the finished product, or to any of the materials entering into its preparation before manufacture, may be added flavoring, medicaments, or other substances according to the tastes or desires of the users of the gum. After the ingredients are suitably mixed the product may be moulded into any desired form and put up in packages in a manner similar to commercial chewing gum.

This improved chewing gum will serve the same purposes as the ordinary commercial chewing gum, and in addition will serve to cleanse the teeth much more thoroughly than commercial chewing gum for the reason that commercial chewing gum is very smooth. In fact, it is one of the chief aims of the manufacturers of commercial chewing gum to produce as smooth a gum as possible and, in order to effect this, various substances capable of rendering the gum smooth are employed by them.

When bran is employed it gives the product, when chewed, a degree of roughness sufficient to clean the teeth and at the same time the bran acts to polish the teeth. I am aware that it is not new to employ bran which has been roasted or to employ charcoal made from wheat and other grains, but the roasting and carbonizing operations destroy the fibers or, at least, take from the fibers the flexibleness characteristic of bran, making the fibers brittle so that they break into particles so minute as to render them useless for effecting the brushing or scouring action characteristic of bran which has not been so treated and which may, therefore, for clarity, be termed commercial bran to distinguish it.

I claim:

1. A chewing gum having as ingredients a binder, and commercial bran of which the flexible character of the fiber has not been destroyed.

2. A chewing gum as in claim 1 whereof the ingredients are combined in the proportions of approximately one part of bran to eight parts of the binder.

Signed at Los Angeles, California, this 31st day of January, 1920.

WILLIAM A. STEINEMANN.

Witnesses:
GEORGE H. HILES,
L. BELLE WEAVER.